United States Patent [19]
Greenfield

[11] 3,873,221
[45] Mar. 25, 1975

[54] FRAME JOINT

[75] Inventor: Gordon Stewart Greenfield, Sutton Coldfield, England

[73] Assignee: Steel Equipment Company Limited, West Bromwich, Staffordshire, Great Britain

[22] Filed: Oct. 10, 1973

[21] Appl. No.: 405,245

[30] Foreign Application Priority Data
Oct. 12, 1972 United Kingdom............... 47007/72

[52] U.S. Cl................. 403/189, 52/758 R, 403/267
[51] Int. Cl........................ F16b 11/00, F16b 12/04
[58] Field of Search............. 52/665, 758 C, 758 R; 403/187, 199, 231, 255, 403, 189, 267

[56] References Cited
UNITED STATES PATENTS

| | | | |
|---|---|---|---|
| 922,919 | 5/1909 | Lawrence.......................... | 52/758 C |
| 2,380,379 | 7/1945 | Attwood.......................... | 52/758 C |
| 2,696,139 | 12/1954 | Attwood.......................... | 52/758 C |
| 3,051,517 | 8/1962 | Yalen................................. | 403/403 |

FOREIGN PATENTS OR APPLICATIONS

| | | | |
|---|---|---|---|
| 923,119 | 4/1963 | United Kingdom................ | 403/187 |
| 1,361,398 | 4/1964 | France.............................. | 403/187 |

*Primary Examiner*—Frank L. Abbott
*Assistant Examiner*—James L. Ridgill, Jr.

[57] ABSTRACT

A method and means for connecting structural members which form part of a racking or shelving framework comprising a sheet metal member connected by two end portions to one structural member and a pin-like member which extends through the other of the two members for engagement by the sheet metal member.

11 Claims, 2 Drawing Figures

PATENTED MAR 25 1975 3,873,221 ptcon# FRAME JOINT

BACKGROUND OF THE INVENTION

This invention relates to a method of and means for connecting two structural members together, especially the structural members of frameworks designed to be assembled and taken apart with relative ease. Such frameworks find use as racking and shelving for stores and warehouses.

Where the uprights of such a framework are in the form of hollow rectangular section tubular or channel-section stanchions, it is known to provide external lugs, welded to it at vertically spaced intervals to receive horizontal supports or ledgers; it is also known to secure the horizontal members by means of bolts passing through holes drilled in the uprights. There are also various proprietary systems involving spaced lugs or slots formed on or in the wall of the upright to receive corresponding lugs on the horizontal members or on separate supporting clips.

STATEMENT OF THE INVENTION

The present invention consists in forming a connection between two structural members using a sheet metal member and pin-like member; the sheet metal member having two end portions which lie in a common plane and are connected to one structural member, and a central portion which connects the end portions and extends to one side of said common plane away from said one structural member so as to define an aperture with said common plane; and the other of the two structural members being adapted for connection to the sheet metal member by the pin-like member which can be engaged with the said other of the two members and inserted through said aperture between the central portion and the said common plane so as extend the width of said central portion.

When the invention is applied to the vertical and horizontal members of a framework used for racking, the vertical member preferably has the sheet member connected to it and the horizontal member is connected to the sheet metal member by the pin-like member. In this way, bolt holes or other weakening holes or notches are avoided in the vertical member while still allowing the horizontal member to be connected to the vertical member by a bolt or other pin-like member which lies close to the vertical member.

Where said one structural member is a member of C-shaped channel section with inwardly directed flanges on each side of the channel opening, each end portion of the sheet member is preferably formed with laterally extending portions on both sides thereof which are located within the channel section so as to engage behind the inwardly directed flanges while the central portion of the sheet metal member extends away from the channel opening.

Preferably, the sheet metal member is welded to said one structural member by four simple welding runs between the edges of the inwardly directed flanges and the end portions of the sheet metal member. These welds are at easily accessible points; moreover the main stresses on the lug are taken directly through the end portions to the flanges, and the welds virtually only have to take the simple shear stresses due to dead weight acting along the axis of the upright.

Where said other structural member is of channel section, this preferably fits over the central portion of the sheet metal member so that it is located laterally and against twisting without throwing these locating loads on the bolt or other pin-like member.

BRIEF DESCRIPTION OF THE DRAWING

The invention will now be described by way of example with reference to the accompanying drawing in which.

DESCRIPTION OF THE PREFERRED EMBODIMENT

Figure 1:
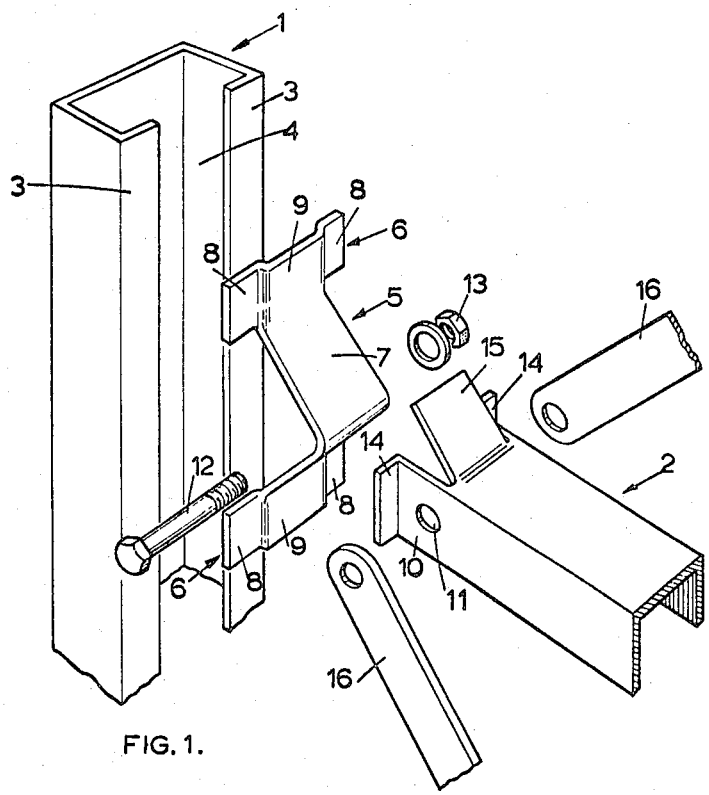
FIG. 1 shows an exploded perspective view of a connection between two structural members according to the invention.
Figure 2:
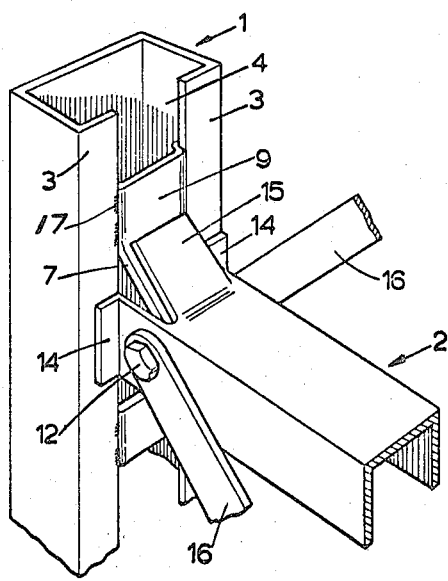
FIG. 2 shows a perspective view of the structural members of FIG. 1 when connected

The two structural members 1 and 2 which are to be connected together are the vertical upright or stanchion 1 and the horizontal member 2 of a framework suitable for use as racking. Both structural members 1 and 2 are of channel section, the upright 1 being of C-shaped channel section with two inwardly directed flanges 3 which define the channel opening 4 therebetween, and the horizontal member being of simple channel section with the web of the channel uppermost.

A sheet metal member 5 is formed as a pressing or stamping comprising two end portions 6 which lie in a common plane and are connected by a central portion 7 of V-section which extends to one side of said common plane so as to define an aperture with said common plane. Each end portion 6 is formed with a laterally extending portion 8 at each side which is joggled away from said central portion. These laterally extending portions 8 are located within the channel section upright 1 so as to engage behind the flanges 3 with the intermediate portions 9 between the laterally extending portions 8 received within the opening 4 of the channel section. The edges of the intermediate portions 9 lie closely adjacent the inner edges of the flanges 3 and these edges are welded together as at 17 along the whole of their mutual length.

The end of the horizontal member 2 which is to be connected to the upright 1, is adapted to fit over the central portion 7 of the sheet metal member 5. The widths of these two members are such that they are a close fit and the horizontal member 2 is located laterally and against twisting. Side portions 10 at this end of the member 2 are formed with apertures 11 which are positioned on opposite side of the aperture defined by the central portion 7 of the sheet metal member 5 and have a bolt 12 inserted therethrough so as to secure the horizontal member 2 to the sheet metal member 5. A nut 13 is threaded on the free end of the bolt 12 to secure the latter in place.

The member 2 is located positively on the sheet metal member 5 so that the bolt 12 engages the angle of the V-section central portion 7 and the member 2 is held against rotation, this being achieved by the outwardly bent flanges 14 at the end of the side portions 10 and the upwardly bent web portion 15 between the side portions 10. The flanges 14 engage the flanges 3 of the upright 1 and space the apertures 11 and bolt 12 in the correct horizontal position, and the web portion 15 is inclined at the same angle as the upper limb of the V-section central portion 7 so that the two make surface-to-surface contact and space the apertures 11 and bolt 12 in the correct vertical position.

As shown in the drawings the sheet metal member 5 and bolt 12 also serve to connect two flat diagonal braces 16 to the upright 1.

It will be appreciated that although a bolt 12 is being used in the illustrated embodiment, any pinlike securing member such as a pin or rivet can be used instead.

What we claim as new and desire to secure by Letters Patent of the United States is:

1. A connector for securing together two structural members comprising a first structural member having a C-shaped channel section with an inwardly directed flange on each side of, and in the plane of, the channel section opening, and a second structural member having a simple channel section consisting of a web joining two spaced side portions, comprising in combination, a sheet metal member having two end portions which lie in a common plane interconnected by a central portion which extends to one side of said common plane so as to define an aperture with said common plane, means for connecting said end portions which lie in a common plane to the inwardly directed flanges in the plane of the first structural member channel opening, said second structural member side portions each having an aperture formed therein for receiving a pin-like member whereby said side portion apertures will be aligned with the aperture defined by the sheet metal member upon juxtopositioning of the structural members together for securement together by the said pin-like member.

2. A connector as claimed in claim 1 in which the means for connecting the end portions to the first structural member consists of each end portion of the sheet metal member having laterally extending portions on both sides thereof which can be located within the channel section of the first structural member so as to engage behind the inwardly directed flanges of the said structural member.

3. A combination as claimed in claim 2 in which the laterally extending portions of each end portion are joggled with respect to an intermediate portion so that the intermediate portion is received within the opening of the channel section structural member and lies closely adjacent the inner edges of the inwardly directed flanges on each side of the opening.

4. A combination as claimed in claim 3 in which the sheet metal portion is connected to the said one structural member by being welded thereto by said end portions.

5. A combination as claimed in claim 4 in which each end portion is welded to said one structural member along the adjacent edges of the intermediate portion and of the inwardly directed flanges.

6. A combination as claimed in claim 3 in which, when the structural members are connected together, the two side portions of the second structural member are positioned closely adjacent each side of the central portion of the sheet metal member.

7. A combination as claimed in claim 6 in which the web of the channel section of the second structural member between said apertured side portions is shaped so that it engages the central portion of the sheet metal member when the structural members are connected together.

8. A combination as claimed in claim 7 in which the structural members are adapted to be assembled together with said first structural member extending substantially vertically and said second structural member extending substantially horizontally with the web uppermost, and in which the web between the apertured side portions is inclined upwards relative to the rest of the web so as to lie on a surface of the central portion of the sheet metal member when the structural members are connected together.

9. A combination as claimed in claim 6 in which the ends of the apertured side portions of the channel section second structural member are outwardly bent to form flanges adapted to engage the inwardly directed flanges of the first structural member so as to bear against the latter and hold the said first structural member against rotation about the pin-like member when the structural members are connected together.

10. A combination as claimed in claim 9 in which the central portion of the sheet metal member is V-shaped and the pin-like member engages the angle of the V when the structural members are connected together.

11. A combination as claimed in claim 9 in which the pin-like member is a bolt and in which a nut is threaded on the bolt to hold it in place.

* * * * *